…

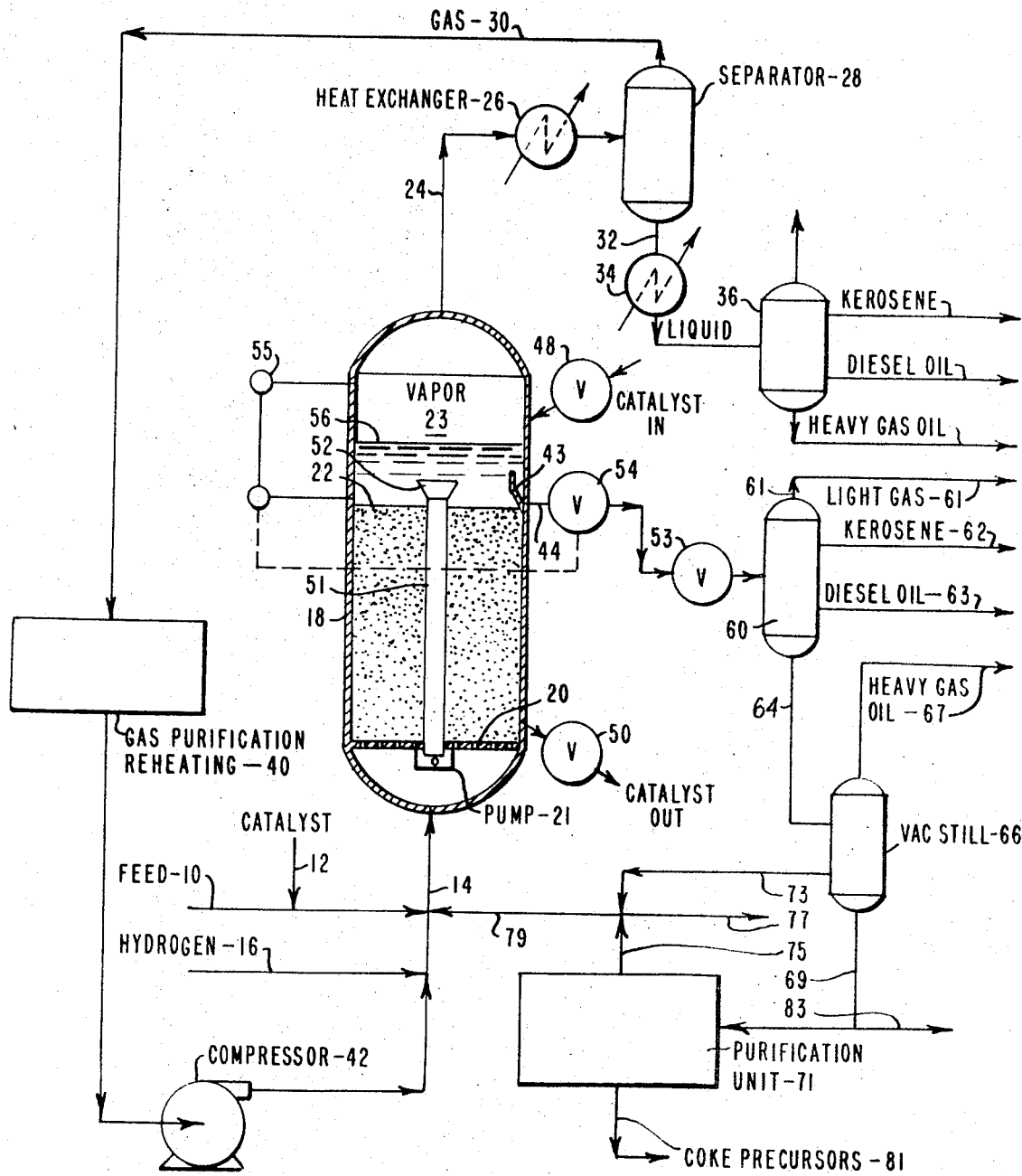

United States Patent Office 3,549,517
Patented Dec. 22, 1970

3,549,517
HIGH CONVERSION LEVEL HYDROGENATION OF RESIDUUM
Leon M. Lehman, Brooklyn, and Axel R. Johnson, North Babylon, N.Y., assignors to Hydrocarbon Research, Inc., New York, N.Y., a corporation of New Jersey
Filed July 23, 1968, Ser. No. 747,786
Int. Cl. C10g 23/00
U.S. Cl. 208—108    4 Claims

ABSTRACT OF THE DISCLOSURE

A hydrogenation of a petroleum residuum containing at least 25 volume percent of material boiling above 975° F. by reacting the feed with hydrogen at elevated temperatures and pressures in an ebullated catalytic bed reactor, separating the vapors from the liquid effluents, fractionating the liquid effluent to produce a fraction boiling above about 900° F., removing the asphaltenes and condensed polycyclic aromatics from the fraction in order to purify it and recycling the purified fraction to the reactor, which recycle results in prolonged reactor life, increased conversion of the 900° F. plus material in the feed at reduced severity levels and prevention of coking in the reactor.

BACKGROUND OF THE INVENTION

This invention relates to improvements in the method of converting residual petroleum fractions to lower boiling materials. It specifically concerns itself with maintaining an operable system at high levels of conversion of charge stock boiling above 900° F.

When converting a residuum by restructive hydrogenation, the primary objective is generally to obtain as high a level of conversion of the residuum as is compatible with an operable system. The ultimate goal is, of course, to convert all of the charge stock boiling above about 900° F. to lower boiling material such as gasoline, kerosene, jet fuel, diesel oil and heavy gas oil with the complete elimination of low grade higher boiling liquids.

It is understood that when converting a residuum by destructive hydrogenation under the necessary high temperature and pressure conditions, that many reactions take place including saturation, polymerization, cracking, desulfurization, denitrogenation, hydrogenation and similar reactions which all proceed simultaneously, although usually at different rates. The results, then, are basically empirical and are functions of feed stock characteristics, temperature, pressure, space velocity, hydrogen rate, catalyst type and catalyst density.

The catalytic hydrogenation of residuum is well known and in the patent of Johanson, 2,987,465, a process is disclosed wherein the reaction is accomplished in the liquid phase with the heated residuum and hydrogen passed upwardly through a bed of catalyst at such a rate as to force the particles into random motion. The majority of the liquid passing through the bed can be recycled from a point above the top of the catalyst bed back through the inlet at the bottom.

One of the unique features of such a system is that operating conditions are controlled so as to eliminate any substantial carryover of catalyst from the reaction zone. The most beneficial feature of this type of operation is that the reaction zone is maintained at substantially isothermal conditions. It is, therefore, possible to utilize a higher average temperature, and because of the avoidance of high local temperatures, the catalyst tends to remain clean for a long period of time. In addition, due to the upward flow of the reactants and the expansion of the bed, any coke that might be formed is passed through the bed without difficulties, and the total pressure drop across the bed does not change.

Experience has shown, however, that coke formation is a major determinative factor on the operability and life of the process. It has also been determined that the presence of asphaltenes and condensed polycyclic aromatics in the reactor liquid favor the formation of coke and, thus, it was felt to be desirable to minimize the presence of these compounds in the reactor system. It was discovered, at that time, in the laboratory of the assignee, that a major cause of coking in the reactor was due to the precipitation of the asphaltenes and condensed polycyclic aromatics in the reactor and the consequential polymerization of these materials, particularly on the hot surfaces within the reaction system. Such precipitation also occurred in the pipes and valves of the reaction system, all of which led to fouling and coking of the entire system. The solution of this problem resulted in the recycle of a gas oil boiling in the range of about 680 to 975° F., which recycle maintained the asphaltenes and condensed polycyclic aromatics in solution and prevented their adherence to internal reactor surfaces.

Several disadvantages, however, became apparent due to the gas oil diluent recycle operation. First, the gas oil took up valuable space in the reactor, leaving that much less room for higher boiling residuum materials which it was desired to convert.

Second, the recycled material itself was subjected to reaction conditions for a longer period of time and it was converted to lower boiling products, i.e., kerosene and naphtha. These lower boiling products, although valuable, may be less desirable than the gas oil fraction itself. Furthermore, this conversion causes additional hydrogen consumption. Thus, while the gas oil recycle resulted in some increased operability, a consequential result was the accompanying decreases in higher boiling distillate yields.

While specific fraction cut points, i.e., 975° F. are given for the illustration of a particular situation, it is understood that the cut point will vary depending on the feed used, the products desired, etc. Generally, the lowest cut point would be about 900° F., and although lower cut points have been used, this temperature will be used hereafter for the sake of clarity, it being understood that said temperature is not necessarily a critical requirement of the inventive concept contained herein.

It was also found, at this time, that the use of a recycle stream of material boiling above 900° F., usually the bottoms from the fractionation of the reactor liquid effluent, resulted in increased conversions of the residuum content of the feed. As a result of the increased conversion, the severity level of the reaction could be lowered. A major disadvantage, however, of recycling this particular fraction, was that included in with the residuum material in the recycle, were the aspahltenes and condensed polycyclic aromatics, which tended to increase the amount of coking even at the lower severity levels of such reaction systems. Thus, while recycle of particular product fractions has been used in the past, to either improve operability or improve conversion level, each particular type of recycle had disadvantages which tended to negate the improvements obtained thereby.

SUMMARY OF THE INVENTION

We have discovered that by the use of a purified recycle stream of material boiling above about 900° F. in a residuum hydrogenation process, the operability of the process can be improved by providing solvent for materials which may form catalyst deposits and coke, while at the same time, increasing the concentration of residuum material in the reactor, thus, leading to increased conversion and selectivity of the process. In addition, however, our invention allows one to avoid the increased reactor space requirements for given conversion levels and the wasteful hydrogen consumption and lost product value usually accompanying a gas oil recycle, without the added disadvantage of returning asphaltenes and other coke pre-cursors or condensed polycyclic aromatics to the reactor which decrease system operability.

More particularly, we have found that one may obtain the above advantages without the disadvantages mentioned previously by treating the 900° F. plus material which would normally be used as the vacuum bottoms recycle, in such a manner as to remove the asphaltenes and polycyclic aromatics therefrom. This purified 900° F. plus product may then be used as the recycle stream to the reactor. The use of such a stream combines the advantages of both a gas oil recycle and a residuum recycle, while avoiding the disadvantages. This material is a relatively nonvolatile liquid which is an excellent solvent for potential coke forming material. Furthermore, as this material boils above 900° F., it increases the concentration of said residuum in the reactor, and thereby increases the conversion and selectivity.

DESCRIPTION OF THE DRAWING

The drawing is a schematic view of a hydrogenation process for high conversion of hydrocarbon oils.

DESCRIPTION OF THE PREFERRED EMBODIMENT

As more specifically shown in the drawing, a feed 10 of a residuum may be combined with a catalyst 12, which may be in the form of a slurry, and fed by line 14 with hydrogen from line 16 through a reactor generally designated 18. As taught in the Johanson patent, above referred to, the reactor may have a liquid distributor and catalyst support 20 so that the liquid and gas passing upwardly through the reactor 18 will tend to put the catalyst in random motion.

The catalyst particle size range is usually narrow for uniform expansion under controlled liquid and gas flow conditions. While the overall range is usually between 4 (⅛" extrudates) and 325 mesh (USS), we contemplate a so-called once-through operation using catalyst in the 100–200 mesh range with a liquid velocity in the order of 1–10 gallons per minute per square foot of horizontal reaction space. Alternatively, larger catalyst, usually extrudates having diameters of about ⅓₂" can be used by adequate recycle of heavy oil from the top to the bottom through the feed to provide from about 40 to 60 gallons total liquid per minute per square foot of horizontal reactor space. It is also possible, of course, to use catalyst in the 40–80 mesh range by proper selection of the liquid rate and the other relative operating variables. If larger catalyst is used, it may be necessary to use pressure control chambers, not shown, with the catalyst introduced through valve 48 and removed through valve 50.

By control of the catalyst particle size and density and liquid and gas velocities and taking into account the viscosity of the liquid and the lifting effect of the hydrogen under the operating conditions, the catalyst bed may be expanded to have a definite level or interface indicated at 22 in the liquid. It will be apparent that the settled level of the catalyst, as when the liquid rate drops below a catalyst sustaining value, will be considerably lower than level 22. Normally, bed expansion should be at least 10% and seldom over 300% of the static level, and the liquid rate will be usually in the range of 1 to 100 gallons per minute per square foot of horizontal cross section of the reactor.

In a reactor system of this type, we provide a vapor space 23 from which a vapor overhead, completely free of liquid, is removed at 24. This may be conveniently cooled and partially condensed in heat exchanger 26 and separated in separator 28 into a gaseous portion removed overhead at 30, and a liquid portion removed at 32. The gaseous portion 30, which is largely hydrogen, may be purified by conventional means 40 and after being reheated, can be recycled through compressor 42 to the feed line 14 to the reactor.

Internal circulation of liquid within the reactor from above the interface 22 to below the distributor deck 20 is also usually desirable to assure completeness of the reaction and to establish a sufficient upflow liquid velocity to assist in maintaining the catalyst in random motion (ebullated) in the liquid. This is preferably accomplished by the use of a central conduit 51 having an enlarged conical of funnel type cap 52. The conduit extends to a pump 21 below the distributor deck 20 to assure a positive and controlled movement of the liquid downwardly.

The recycle of liquid through internal conduit 51 has many mechanical advantages and tends to eliminate external high pressure connections as would be required in a hydrogenation reactor. Nevertheless, as described in the aforementioned Johanson patent, recycle can be established by an external pump.

The liquid portion 32 from separator 28 is cooled in heat exchanger 34 and then fractionated in distillation column 36 into fractions boiling in the gasoline range (overhead), kerosene and diesel oil (side streams), and a heavy gas oil (bottoms).

A heavy liquid effluent from the reaction zone and free of catalyst is recovered from the liquid effluent in the upper part of reactor 18 by trap tray 43, such liquid in line 44 passing through pressure reducing valve 53 and being fractionated without cooling, in distillation column 60. Preferably, light products such as light gas, are removed overhead at 61, and kerosene and diesel oil boiling range materials are removed as side streams 62 and 63. A fuel oil fraction is removed at 64 as bottoms.

The fuel oil fraction 64 which, for the most part, boils above 680° F. is passed to a vacuum still 66 and fractionated into fractions boiling higher than about 900° F. and a product fraction boiling below about 900° F., i.e., a heavy gas oil overhead in line 67. The bottoms material in line 69 is then composed of all that material in the liquid reactor effluent boiling in excess of about 900° F. including the asphaltenes and condensed polycyclic aromatics. This stream may then be introduced to a purification step 71, wherein the 900° F. plus boiling materials are separated from the coke precursors and the purified residuum stream is removed through line 75 and may then be recycled to the unit through line 79 or if preferred, removed as product through line 77. The coke precursors are removed from the purification unit 71 through line 81. It is also possible, if desired, to remove all or a portion of the vacuum bottoms material in line 69 as a product fraction in line 83.

The purification unit 71 may be either a second vacuum distillation in which case the purified residuum stream would comprise the overhead from such a vacuum fractionation and the bottoms, of course, the coke precursor stream. Alternatively, the purification step may consist of a propane or butane extraction unit. The extract or maltenes from such a light paraffin extraction, i.e., $C_2$–$C_8$ hydrocarbons, would then be recycled to the residuum H-oil reactor. Such extraction units are well-known in the art. A third alternative would be to remove a side stream from the vacuum still 66, said stream composed generally of about 800° F. plus boiling material. This stream in line 73 would then be used as the purified residuum stream for recycle to the reactor through line 79. In such a case, the bottoms in line 69 would then be composed of the asphaltenes and condensed polycyclic aromatics.

The amount of recycle used relative to the feed rate may vary widely, but would normally be between about 1 to about 25 vol percent in relation to the feed. As shown, portions of the asphaltene free residuum stream may be removed from the system as product and it is not necessary that all of the stream be recycled.

The following examples are illustrative of operations in accordance with this invention.

EXAMPLE I.—TWO STAGE HYDROGENATION

| | Run No. | | | |
|---|---|---|---|---|
| | 1 | 2 | 3 | 4 |
| | No recycle | Recycle 680–975 °F. | Recycle 975° F.+ | Recycle 975–1,050 °F. |
| Feed, 10.1° API long residuum | (−54% 975° F. plus material) | | | |
| Conditions: | | | | |
| Pressure, p.s.i.g. | 2,800 | | | |
| Temperature, °F. | 840 | | | |
| Hydrogen rate, s.c.f./bbl. ff.: | | | | |
| First stage | 6,000 | | | |
| Second stage | 3,600 | | | |
| Hydrogen purity, percent | 80 | | | |
| Percent recycle (on feed) conversion, percent 975° F.+ | | 10 | 10 | 10 |
| Reactor Concentrations, 1st stage: | | | | |
| Wt. percent 975° F.+ | 47.7 | 38.9 | 57.7 | 55.4 |
| Wt. percent 1,050° F.+ | 36.4 | 29.5 | 45.6 | 26.1 |
| 2nd stage: | | | | |
| Wt. percent 975° F.+ | 61.5 | 40.1 | 71.7 | 66.0 |
| Wt. percent 1,050° F.+ | 60.7 | 38.4 | 64.6 | 24.1 |

Example I presents a comparison of results obtained using various types of recycle in a two stage ebullated bed hydrogenation process. Specificaly, this system involves the separation of liquid and gaseous effluents from the first reaction stage with the liquid effluent being fed to the second reaction stage. The second stage effluent was then fractionated and the purified fraction boiling between about 975° F. to about 1050° F. was recycled to the first stage as described.

Run No. 1 represents a base case in that under the conditions shown, the second stage was inoperable. It will be noted that the concentration of 1050° F. + material in the second stage is about 61%. Since this fraction contains all of the asphaltenic components in the effluent, the high concentration of the asphaltenes is the most probable cause of the inoperability. The first stage of Run No. 1 was operable and, as shown, contained about one half as much 1050° F.+ material as the second stage.

In Run No. 2, using recycle of a 685° F. to 975° F. gas oil, the 1050° F.+ concentration in the second stage is about the same as the first stage of Run No. 1. This system was operable. However, the concentration of 975° F.+ material in each stage is less than the corresponding stages of Run No. 1. Thus, the reactor size must be increased to achieve the same conversion level as in Run No. 1. Using the same temperatures and pressures, it would be necessary to increase the size of the second stage reactor by 50%.

In Run No. 3, a 975° F.+ recycle was used. As a result, the second stage, which contained greater than 64% of 1050° F.+ material was generally poor.

Run No. 4 illustrates the improvement obtained over the other runs with our invention. As shown, the amount of 1050° F.+ material is much less than Run No. 1, while the amount of 975° F.+ material is greater. Thus, the advantages of Runs Nos. 2 and 3, are obtained without their inherent disadvantage.

While we have shown and described only a specific type of multistage operation, our invention is easily applicable to other multistage processes. Numerous combinations of such systems are known to the art, e.g., those wherein the gaseous and liquid effluent is passed on to the next subsequent stage, those with the stages in parallel and/or series, and those wherein the recycle stream is added to any or all of the stages. The particular combination of stages is not critical to the operation of our invention.

EXAMPLE II.—SINGLE STAGE HYDROGENATION

| | Run No. | | | |
|---|---|---|---|---|
| | 5 | 6 | 7 | 8 |
| | No recycle | Recycle 680–975 °F. | Recycle 975° F.+ | Recycle 975–1,050 °F. |
| Feed, 7.0° API vacuum residuum | | | | |
| Conditions: | | | | |
| Pressure, p.s.i.g. | 2,000 | | | |
| Temperature, °F. | 832 | | | |
| Hydrogen rate, s.c.f./bbl. | 5,200 | | | |
| Hydrogen consumption, s.c.f./bbl. | 1,300 | | | |
| Conversion, 975° F.+ | 78 | 78 | 71 | 71 |
| Percent recycled (on feed) | | 10 | 10 | 10 |
| Relative reactor size | 1 | 1.19 | 0.87 | 0.88 |
| Reactor conditions: | | | | |
| Wt. percent 975° F.+ | 46.2 | 38.9 | 53.4 | 52.7 |
| Wt. percent 1,050° F.+ | 32.9 | 27.5 | 37.7 | 26.3 |

Example II shows the application of our invention to a single stage hydrogenation process. While the results with this single stage are not as striking as the multiple stage system, the advantage is a matter of degree and the basic concept of our invention is still applicable.

In Run No. 5, which represents the base case, recycle was not used and the amount of asphaltene-containing material as relatively high and operability was marginal. In Run No. 6, using a gas oil recycle, the amount of 1050° F.+ material was substantially decreased over that in Run No. 5 with the resultant improvement in operability. However, because of the consequent decrease in the amount of 975° F.+ material, a 19% increase in reactor size is required to achieve the same conversion as in Run No. 5.

In Run No. 7, because of high concentration of 1050° F.+ material in the reactor, the system gave satisfactory operability at conversion levels of about 71% or below. Assuming operability, however, the reactor size required to obtain 78% would be 13% less than Run No. 5.

Run No. 8 illustrates the use of our invention in a single stage process and, in effect, combines the advantages of both Runs Nos. 6 and 7. While the concentration of 975° F.+ material and the conversion are essentially the same as that in Run No. 7, the concentration of 1050° F.+ material is even less than that in Run No. 6. Thus, the operability of this system is substantially improved over that of Runs Nos. 5 and 7. Additionally, however, the reactor size necessary to obtain 71% conversion is equivalent to that required in Run No. 7.

It should be noted that while we refer to 1050° F. concentration as a measure of operability, this is only a valid measure of operability for a given feedstock at a fixed severity. This is true because it is the asphaltenic compounds that are generally responsible for non-operability and these occur exclusively in the 1050° F.+ fraction. However, the proportion of asphaltenes in the 1050° F.+ fraction varies with feedstocks and, for a given feedstock, increases as conversion per pass increases. Additionally, it should be understood that while we have cited specific boiling point fractions, the exact boiling range of the recycle fraction is wholly dependent on the nature of the feed. Thus, the recycle material may have a boiling range greater or less than 975° F. to 1050° F. The basic requirement is that the material recycled be free of the condensed polycyclic aromatics, particularly asphaltenes, which result in inoperability, and yet still contain as high a concentration as possible of that material which it is desired to convert to lower boiling products, usually 900° F.+ boiling material. Also, while we have shown 10% recycle based on feed in the above examples, it is possible and desirable to use significantly decreased amounts of recycle with our invention and still obtain the advantages mentioned above. Generally, the amount of recycle for such processes using our invention would be in the range from about 1 to about 25 volume percent based on feed.

Although the above example and discussion discloses a preferred mode of embodiment of applicants' invention, it is recognized that from such disclosure, many modifications will be obvious to those skilled in the art and it is understood therefore, that applicants' invention is not limited to only those specific methods, steps or combination or sequence of method steps described, but covers all equivalent steps or methods that may fall within the scope of the appended claims.

We claim:

1. In the process of hydrogenating a reduced crude having at least 25 volume percent boiling above 975° F. wherein said crude, at a temperature between about 750 and about 900° F. and at a pressure between about 1000 and 5000 p.s.i.g. together with at least 2500 s.c.f. bbl. of hydrogen-rich gas passes upwardly through a reaction zone in the presence of a hydrogenation type catalyst having a narrow size range, said range falling between about 4 and about 325 mesh wherein the upward flow velocities of liquid and hydrogen through the catalyst are such as to expand the bed of catalyst at least 10% over the settled state volume and to maintain the catalyst in random motion in the liquid wherein the space velocity of the liquid is such as to accomplish more than 50 percent conversion of the 975° F. plus boiling components in the feed to products boiling below 975° F. and to partially remove sulfur wherein the improvement comprises:

(a) separating the products into gaseous and liquid fractions, one of the liquid fractions being rich in 900° F. plus boiling material and which also contains substantially all of the asphaltenes and condensed polycyclic aromatics in the feed;
   (b) purifying the said 900° F. plus liquid fraction by removing the asphaltenes and condensed polycyclic aromatics from said fraction;
   (c) separating a 975° F.–1050° F. boiling range fraction from the purified liquid fraction;
   (d) and recycling the 975°–1050° F. boiling range fraction to the reaction zone at a rate equivalent to between about 1 and about 25 volume percent of the feed, whereby coke formation on the catalyst in the reaction zone is reduced.

2. The process as claimed in claim 1 wherein the reaction temperature is about 840° F., the reaction pressure is about 2800 p.s.i.g., the hydrogen-rich gas rate is about 5200 s.c.f./bbl., and wherein the purified recycle fraction is purified by vacuum distillation, said purified fraction containing materials boiling in the range from about 975° F. to about 1050° F. and wherein the amount of the purified fraction recycled represents about 10% of the feed on a volume basis.

3. The process as claimed in claim 1 wherein the concentration of materials in the reaction zone boiling in the range from about 975° F. to about 1050° F. is above about 50 weight percent and the concentration of materials boiling above about 1050° F. is below about 35 weight percent.

4. The process as claimed in claim 1 wherein the gaseous and liquid effluents are thermally fractionated at atmospheric pressure into higher boiling and lower boiling fractions after which the higher boiling fractions are subjected to thermal fractionation at below atmospheric conditions to produce an overhead product material and an asphaltene and condensed polycyclic aromatic containing bottoms material and wherein the bottoms material is subjected to another thermal fractionation step at below amospheric pressure to produce the asphaltene and condensed polycyclic aromatics-free fraction for recycle.

References Cited

UNITED STATES PATENTS

| | | | |
|---|---|---|---|
| 2,925,376 | 2/1960 | Mertes | 208—96 |
| 3,215,617 | 11/1965 | Burch et al. | 208—59 |
| 3,412,010 | 11/1968 | Alpert et al. | 208—108 |

DELBERT E. GANTZ, Primary Examiner

A. RIMENS, Assistant Examiner

U.S. Cl. X.R.

208—59, 96